June 18, 1946.  F. G. KEAR  2,402,410
RADIO BEACON SYSTEM
Filed Jan. 27, 1942
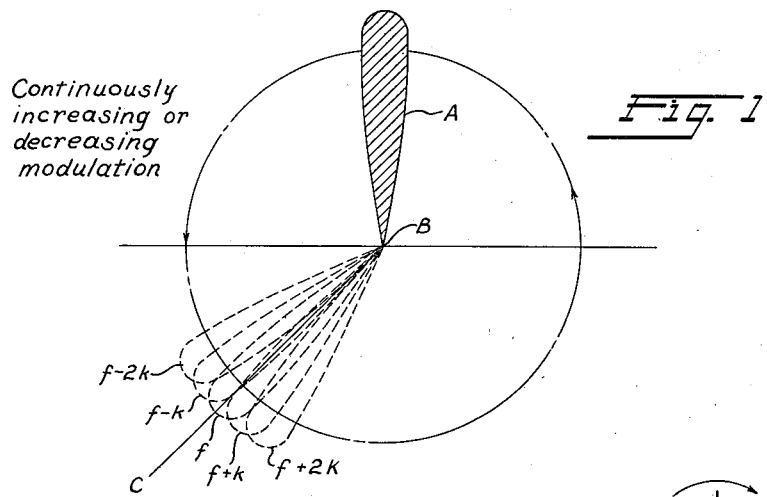
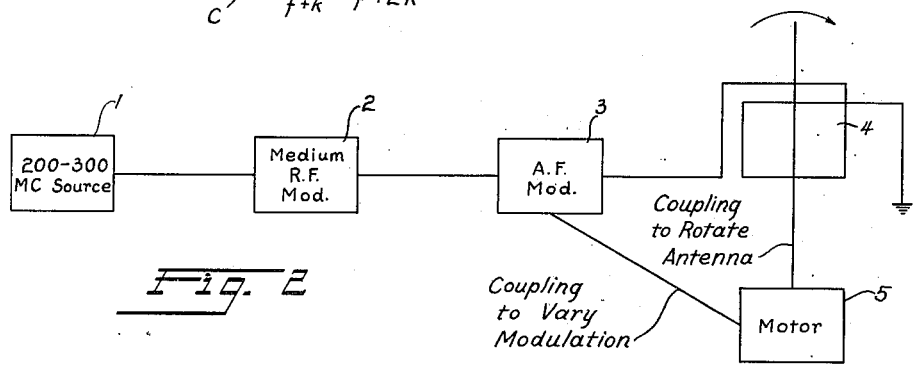
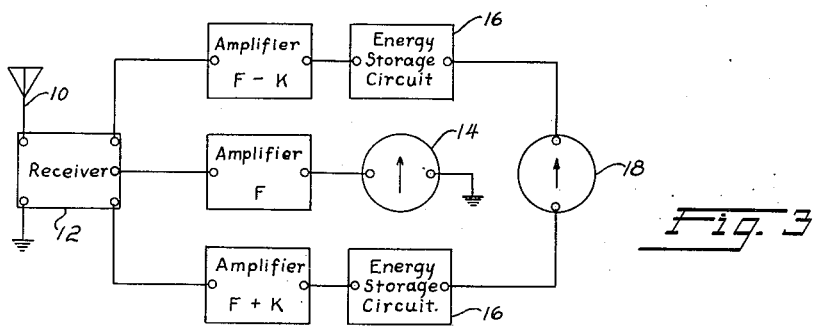
Inventor
Frank G. Kear
By Samuel Scrivener Jr.
Attorney Patented June 18, 1946

2,402,410

UNITED STATES PATENT OFFICE 2,402,410

RADIO BEACON SYSTEM

Frank G. Kear, Washington, D. C., assignor to Washington Institute of Technology, Inc., Washington, D. C.

Application January 27, 1942, Serial No. 428,423

6 Claims. (Cl. 250—11)

This invention relates generally to radio beacon systems and, more particularly, to such systems of the type in which a directional field is radiated and is rotated in azimuth about the source of radiations.

It has heretofore been proposed and is now known to provide a radio beacon comprising a radiated field which is rotated about the source of radiations and which is modulated at an audio frequency rate which varies continuously between predetermined limits in accordance with the instantaneous azimuthal direction. It has also been proposed and is now known to receive the energy due to such a field and, by determining the frequency of modulation at the point of reception, to determine the direction of the source of radiations from the point of reception. However, no means have been available or known for producing from energy received from such a field indications determining a true course toward the source of radiations from any point in space.

It is therefore the principal object of this invention to provide means for producing from received energy due to a field of the type described an indication establishing a true beacon course toward the source of radiations from any point in azimuth about the source.

Other objects and features of novelty of the invention will be made apparent by the following description and the annexed drawing, it being understood however that such description and drawing are only illustrative of the invention, for the limits of which reference must be had to the appended claims.

Referring to the drawing, in which the same reference numerals and letters refer to corresponding parts, Fig. 1 shows diagrammatically the type of radiated field with which the invention is adapted to be employed;

Fig. 2 shows schematically a system for establishing the field shown diagrammatically in Fig. 1, and Fig. 3 shows schematically a receiving and indicating system according to this invention.

The radiating part of a beacon system embodying or employing this invention is shown in Fig. 1 and comprises an elongated, directional field A which is rotated in azimuth about the source of radiations B. This field is modulated, by any suitable means, with an audio frequency modulation which changes continuously as the field rotates. There are thus produced in the area traversed by the field an infinite number of zones each possessing definite modulation characteristics. Thus, along line BC of Fig. 1 there will exist a predominant frequency, which is the instantaneous frequency impressed on field A when its maximum coincides with line BC, and fields of different modulating frequency of gradually decreasing amplitude on either side thereof. Thus, if the frequency of modulation increases as the field moves in a counter-clockwise direction, the field of maximum intensity along line BC will have a modulation frequency $f$, while there will also be observed here fields of decreasing intensity $f-2k$, $f-k$, $f+k$, $f+2k$, etc., $k$ being the increment of increase in the modulating frequency per unit of rotary movement.

A transmitting system for establishing such a field is shown diagrammatically in Fig. 2 and comprises a source of radio frequency energy 1, an intermediate frequency modulator 2, an audio frequency modulator 3, a rotatable directional antenna 4 and a motor 5 which is geared to rotate the antenna and the audio-frequency modulator synchronously, to thereby cause the modulation impressed on the radiated field to vary continuously as the antenna and the radiated field are rotated.

Means are provided by the invention to receive the described radiated field and produce therefrom an indication of the true beacon course from any point in space to the source B. Such means are disclosed in Fig. 3 and comprise a non-directional antenna 10 which supplies a receiver 12. The output of the receiver is connected to supply three selective amplifying channels $f-k$, $f$ and $f+k$ each of which is capable of being tuned successively through the range of frequencies impressed on the rotating field. The tuning of the three channels is staggered so that one channel, $f-k$, lags behind the mean frequency $f$ while the other, $f+k$, leads the mean frequency. The mean frequency amplifier $f$ is connected to an indicating meter 14, while the other channels, $f-k$ and $f+k$ are connected through energy storage circuits 16 to the opposite terminals of a zero-center meter 18 which may be of the milliammeter type.

In the use and operation of the described system the selective circuit $f$ is first, by tuning, caused to pass through the entire range of modulating frequencies employed, and its output is observed, by means of the indicator 14, until maximum amplitude is reached. The frequency at which this maximum amplitude occurs will, of course, indicate the true direction of the transmitter from the location of the receiving means. The two side channels are now tuned, channel $f-k$ being tuned to a frequency just below the observed frequency $f$ and channel $f+k$ being tuned to a frequency just above $f$. The exact amount of frequency difference between $f-k$ and $f$ and $f+k$ and $f$ will be determined by the degree of course sharpness which is desired. The outputs of $f-k$ and $f+k$ are opposed through instrument 18 and, if channel $f$ has been accurately tuned to the maximum frequency and if the frequency differences of the two side channels are identical, the instrument 18 will indicate zero so long as the receiver is moved along the radial line through the source B along which the frequency $f$ occurs, while if there is any deviation to the right or left of this line a right or left deflection of the instrument 18 will occur.

It will be obvious that the frequencies to which the channels $f-k$ and $f+k$ are made to respond will only be present for a small portion of the total time. The storage circuits 16 are therefore provided to cause a steady deflection of the indicator 18.

While I have illustrated and described one embodiment of my invention, it will be apparent to those skilled in the art that other embodiments thereof may be made, as well as improvements and modifications therein, without departing in any way from the spirit and scope of the invention, for the limits of which reference must be had to the appended claims.

I claim:

1. A radio guidance system comprising means for radiating an elongated directional field, means for rotating the field in azimuth about the source of radiations, means for impressing a modulation on said field which varies continuously in frequency as the field rotates, means for receiving said field, tunable means for indicating the frequency having maximum amplitude at the location of the receiver, other tunable means operable to be tuned to frequencies which are respectively above and below the frequency having maximum amplitude, and means for producing an indication of the difference of the amplitudes of the frequencies which are above and below the frequency having maximum amplitude.

2. A radio guidance system comprising means for radiating an elongated directional field, means for rotating the field in azimuth about the source of radiations, means for impressing a modulation on said field which varies continuously in frequency as the field rotates, means for receiving said field, means for indicating the frequency having maximum amplitude at the location of the receiver, other means operable to be tuned to frequencies which are respectively above and below the frequency having maximum amplitude, and means for producing an indication of the difference of the amplitudes of the frequencies which are above and below the frequency having maximum amplitude.

3. A radio guidance system comprising means for radiating a directional field, means for rotating the field about the source of radiations, means for impressing a modulation on said field which varies continuously in frequency as the field rotates, means for receiving said field, tunable means for indicating the frequency having maximum amplitude at the location of the receiver, other tunable means operable to be tuned to frequencies which are respectively above and below the frequency having maximum amplitude, and means for producing an indication of the difference of the amplitudes of the frequencies which are above and below the frequency having maximum amplitude.

4. A radio guidance system for indicating the course from a point in space to the source of a rotating directional field on which is impressed a modulation which continuously changes in frequency as the field rotates, comprising means located at the point in space for receiving the field, means for producing from received energy due to the field an indication of the frequency having maximum amplitude at the location of the receiver, means operable to be tuned to frequencies which are respectively above and below the frequency having maximum amplitude, and means for producing an indication of the difference of the amplitudes of the received energy having frequencies above and below the frequency of maximum amplitude.

5. A radio guidance system according to claim 4, in which energy storage means are provided between the indicating means and each of the means which are tunable, respectively, to frequencies above and below the frequency having maximum amplitude.

6. The method of radio direction finding which consists in rotating a directional radiated field in azimuth about the source of radiations, modulating said field with a signal which continuously and progressively changes in frequency as the field rotates, receiving said field at a point in space, determining the modulation having greatest amplitude at such point, selecting modulations of greater and less frequency than said modulation of greatest amplitude, and producing a course indication which is the difference of the amplitudes of said modulations of greater and less frequency.

FRANK G. KEAR.